Patented Dec. 30, 1941

2,267,731

UNITED STATES PATENT OFFICE 2,267,731

PROCESS FOR THE PRODUCTION OF CAPILLARY-ACTIVE AGENTS

Fritz Guenther, Heidelberg, and Hans Haussmann and Bruno v. Reibnitz, Mannheim, Germany, assignors, by mesne assignments, to General Aniline & Film Corporation, New York, N. Y., a corporation of Delaware No Drawing. Application June 8, 1938, Serial No. 212,504. In Germany June 11, 1937

3 Claims. (Cl. 260—513)

The present invention relates to a process for the production of capillary-active agents by sulphonating olefines.

We have found that very active capillary-active substances can be obtained by introducing true sulphonic acid groups (—$SO_3H$ groups attached to carbon atoms) into aliphatic hydrocarbons or halogen hydrocarbons having at least 15 carbon atoms in the molecule and containing a double linkage which is situated in or near the middle of the carbon chain. Halogen may be introduced into the sulphonation products, if desired.

Unsaturated hydrocarbons of the said nature are for example dimers of olefines having terminal double linkages, as for example of olefines which have been obtained by splitting off water from suitable primary alcohols, for example those contained in the higher boiling by-products formed in the methanol synthesis or by the cracking of high molecular aliphatic hydrocarbons. Unsaturated hydrocarbons suitable for the purpose of the invention may have been obtained from high molecular olefines having terminal double linkages (obtainable for example by splitting off water from high molecular aliphatic alcohols) by isomerization whereby the terminal double linkage has moved towards the middle of the molecule. Furthermore, olefines are suitable which are obtained by converting aliphatic carboxylic acids containing at least 8 carbon atoms into ketones reducing the latter to the corresponding alcohols and splitting off water from these alcohols. There may also be used olefines which have been obtained by splitting off hydrogen halide from halogen hydrocarbons the halogen atoms of which are situated in or near the middle of the carbon chain. High molecular halogen hydrocarbons of the said kind may readily be obtained from the corresponding unsaturated high molecular alcohols by known methods, for example by treatment with thionyl chloride. If halogen hydride is added on to the double linkage at the same time, it may be split off again with the formation of the double linkage without the terminal halogen atoms being split off at the same time, for example by treatment with mild saponifying agents or by distillation. Preferably, olefines of the said nature are to be employed which contain from 15 to 25 carbon atoms.

The introduction of the water solubilizing true sulphonic acid groups into the said high molecular unsaturated hydrocarbons and halogen hydrocarbons may be effected by known methods, as for example while using sulphuric acid monohydrate, chlorsulphonic acid or sulphuric anhydride, if necessary in the presence of inert solvents, such as trichlorethylene or carbon tetrachloride, and also if desired with the addition of substances promoting sulphonation, such as ether, phosphorus pentoxide, acetic anhydride or glacial acetic acid. Valuable sulphonation products can also be obtained by adding on formaldehyde and sulphuric acid, thioethane sulphonic acid or ethionic acid to the unsaturated hydrocarbons or halogen hydrocarbons or by treatment with acetaldehyde disulphonic acid. In all cases working conditions are chosen which lead to the formation of true sulphonic acids. When employing anhydrides or chlorides of inorganic or organic acids, such as phosphorus pentoxide, acetyl chloride, acetic anhydride as additional substances in the sulphonation there may be obtained sulphonation products which contain besides the true sulphonic acid groups also ester groups such as —O—$PO_3H_2$, —O—$SO_3H$ or —O—CO—$CH_3$ groups.

If the sulphonic acids produced contain no halogen, halogen atoms may be subsequently introduced in known manner, as for example by leading in chlorine into the solutions of the sulphonation products, if necessary while irradiating or with an addition of substances promoting the introduction of halogen, such as iodine. In the working up of the sulphonic acids they are converted into salts, as for example by neutralization with alkalies, ammonia or amines or other organic bases, such as dimethylamine, triethanolamine or pyridine.

In the manner as described products are obtained which have the following general formula:

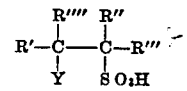

wherein R' means a straight or branched chain aliphatic hydrocarbon radical which may be substituted by halogen atoms, R" and R'" and R'''' are hydrogen atoms, halogen atoms or alkyl radicals which may be substituted by halogen atoms, Y is a hydrogen atom or a hydroxyl group or an ester group, particularly a —O—SO₃H, —O—PO₃H₂ or an —O—CO—CH₃ group. The number of the carbon atoms contained in the substituents or radicals R', R'', R''' and R'''' is at least 13, and the grouping

shall contain about the same number of carbon atoms as the grouping

The radical R' may also be attached to the molecule by a double linkage, in which case R'''' is absent. Such products have the following formula:

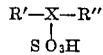

in which X is an unsaturated carbon chain comprising 2 or 3 carbon atoms, while R' and R'' are saturated aliphatic hydrocarbon radicals or halogenated saturated aliphatic hydrocarbon radicals both having about the same number of carbon atoms and together at least 13 carbon atoms.

The products are distinguished by a specially high wetting power, especially in cold treatment baths, as well as high stability in baths containing acids and salts. They may be used alone or together with other substances suitable for the treatment of textiles, as for example inorganic salts, such as common salt, Glauber's salt, waterglass, sodium metaphosphate, solvents, as for example carbon tetrachloride, trichlorethylene, cyclohexanol or tetrahydronaphthalene, or bleaching agents, such as perborates or hydrogen peroxide.

The following examples will further illustrate the nature of this invention but the invention is not restricted to these examples. The parts are by weight.

*Example 1*

125 parts of acetic anhydride are added to 224 parts of di-iso-octylene (prepared by splitting off water from 2-ethylhexanol by means of phosphoric acid with simultaneous polymerization). 125 parts of sulphuric acid monohydrate are then introduced into the mixture at from 10° to 15° C. The sulphonation mixture is stirred for some hours at ordinary temperature until it has become soluble in water giving a clear solution. It is then diluted with water and neutralized by the addition of caustic soda solution. Butanol and ether are then added, the salt solution is separated and the solvent removed by evaporating the solution on the water bath. The aqueous solution of the resulting product has a very good wetting power.

*Example 2*

286 parts of 1-chlor-9,10-octadecylene (prepared by treating oleyl alcohol with thionylchloride at 80° C.) are mixed with 135 parts of acetic anhydride and while stirring at 25° C. 126 parts of sulphuric acid monohydrate are slowly added. The sulphonation mixture is stirred for from about 8 to 10 hours at ordinary temperature, poured onto ice and heated on a boiling water bath for 4 hours. After cooling it is neutralized with caustic soda solution, the sulphonation product salted out with common salt and taken up in ether. After separating the salt solution and evaporating the ether there is obtained a product the aqueous solutions of which have a good wetting power even when strongly diluted.

*Example 3*

196 parts of an olefine fraction having a boiling point of from 130° to 148° C. at a pressure of 7 millimeters (mercury gauge) (prepared by polymerization of an olefine mixture of high molecular alcohols formed as by-products in the synthesis of methanol) are allowed to flow at from 5° to 10° C. into a mixture of 150 parts of chlorsulphonic acid and 150 parts of diethyl ether. The sulphonation mixture is stirred at ordinary temperature until it has become soluble in water to give a clear solution, and it is then poured onto ice and neutralized with caustic soda solution. The solution is shaken with butanol, the salt solution separated and the butanol removed by distillation on the water bath. A product is obtained which has a very good wetting power.

What we claim is:

1. The process of producing a capillary-active agent which comprises introducing a true sulphonic acid group into 1-chlor-9,10-octadecylene.

2. The process of producing a capillary-active agent which comprises mixing 1-chlor-9,10-octadecylene with acetic anhydride and slowly adding a little more than an equimolecular amount of sulfuric acid monohydrate, based upon the chlor-octadecylene, at 25° C., stirring the mixture at this temperature for from about 8 to 10 hours, pouring the mixture into ice and heating it on a boiling water bath for 4 hours, cooling the reaction mixture, neutralizing it with caustic soda solution and separating the sulfonated chlor-octadecylene therefrom.

3. A true sulfonic acid of 1-chlor-9,10 octadecylene identical with that obtained by the process of claim 2.

FRITZ GUENTHER.
HANS HAUSSMANN.
BRUNO v. REIBNITZ.